(12) United States Patent
Lee et al.

(10) Patent No.: US 10,501,570 B2
(45) Date of Patent: Dec. 10, 2019

(54) RUBBERY POLYMER, METHOD OF PREPARING THE SAME, GRAFT COPOLYMER, AND THERMOPLASTIC RESIN COMPOSITION

(71) Applicant: LG CHEM, LTD., Seoul (KR)

(72) Inventors: Jin Hyoung Lee, Daejeon (KR); Young Min Kim, Daejeon (KR); Su Jeong Han, Daejeon (KR); Yoo Vin Kim, Daejeon (KR); Young Hwan Jeong, Daejeon (KR); Sun Haeng Chung, Daejeon (KR); Jae Min Suk, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/547,768

(22) PCT Filed: Nov. 29, 2016

(86) PCT No.: PCT/KR2016/013914
§ 371 (c)(1),
(2) Date: Jul. 31, 2017

(87) PCT Pub. No.: WO2017/142172
PCT Pub. Date: Aug. 24, 2017

(65) Prior Publication Data
US 2018/0340035 A1   Nov. 29, 2018

(30) Foreign Application Priority Data

Feb. 19, 2016  (KR) .................. 10-2016-0019827

(51) Int. Cl.
| | | |
|---|---|---|
| *C08F 279/02* | (2006.01) | |
| *C08F 2/24* | (2006.01) | |
| *C08F 2/38* | (2006.01) | |
| *C08F 236/10* | (2006.01) | |
| *C08F 236/12* | (2006.01) | |
| *C08F 279/04* | (2006.01) | |
| *C08L 51/06* | (2006.01) | |
| *C08F 236/14* | (2006.01) | |

(52) U.S. Cl.
CPC .............. *C08F 279/02* (2013.01); *C08F 2/24* (2013.01); *C08F 2/38* (2013.01); *C08F 236/10* (2013.01); *C08F 236/12* (2013.01); *C08F 236/14* (2013.01); *C08F 279/04* (2013.01); *C08L 51/06* (2013.01); *C08F 2810/20* (2013.01)

(58) Field of Classification Search
CPC .... C08F 2/001; C08F 2/38; C08F 2/24; C08F 236/00; C08F 236/04; C08F 236/06; C08F 236/08; C08F 236/10; C08F 236/12; C08F 236/14
See application file for complete search history.

(56) References Cited

U.S. PATENT DOCUMENTS

| | | | | |
|---|---|---|---|---|
| 2,961,290 A | * | 11/1960 | Gunter ...................... | C08C 1/14 264/184 |
| 5,726,259 A | * | 3/1998 | Hayes ................... | C08F 257/02 524/458 |
| 5,948,870 A | * | 9/1999 | Jang ....................... | C08F 212/08 526/73 |
| 7,629,410 B2 | * | 12/2009 | Westerman ............... | C08F 2/22 524/539 |
| 2012/0034478 A1 | | 2/2012 | Pepers et al. | |

FOREIGN PATENT DOCUMENTS

| | | |
|---|---|---|
| CN | 1269808 A | 10/2000 |
| CN | 104321379 A | 1/2015 |
| KR | 1020110065019 A | 6/2011 |
| KR | 10-1288752 A | 7/2013 |
| KR | 10-2013-0090735 A | 8/2013 |
| KR | 10-2015-0106053 A | 9/2015 |

OTHER PUBLICATIONS

Tzitzinou, Macromolecules, 2000, 33, p. 2695-2708 (Year: 2000).*
Office Action from Chinese Patent Office for Application No. 2016800109711, dated Dec. 11, 2018.
International Search Report for International Patent Application No. PCT/KR2016/013914, filed on Nov. 29, 2016.

* cited by examiner

*Primary Examiner* — Robert C Boyle

(57) ABSTRACT

The present disclosure relates a method of preparing a rubbery polymer, a rubbery polymer, and a graft copolymer and thermoplastic resin composition including the rubbery polymer. In accordance with the present disclosure, a rubbery polymer, in which a large-diameter rubbery polymer and a small-diameter rubbery polymer are formed in a desired ratio by controlling the contents, addition time points, and types of a crosslinking agent, an emulsifier, and a molecular weight regulator when a conjugated diene monomer, the crosslinking agent, the molecular weight regulator, and the emulsifier are polymerized, and a graft copolymer and thermoplastic resin composition having excellent surface gloss and mechanical properties are provided.

18 Claims, No Drawings

RUBBERY POLYMER, METHOD OF PREPARING THE SAME, GRAFT COPOLYMER, AND THERMOPLASTIC RESIN COMPOSITION

CROSS-REFERENCE TO RELATED APPLICATION

This application is a U.S. National Stage of International Patent Application No. PCT/KR2016/013914, filed on Nov. 29, 2016, which claims the priority benefit of Korean Patent Application No. 10-2016-0019827, filed on Feb. 19, 2016 in the Korean Intellectual Property Office, the disclosure of which is incorporated herein by reference.

TECHNICAL FIELD

The present disclosure relates to a rubbery polymer, a method of preparing the same, and a graft copolymer and thermoplastic resin composition including the rubbery polymer. More particularly, the present invention relates to a rubbery polymer, in which a large-diameter rubbery polymer and a small-diameter rubbery polymer are formed in a desired ratio and which enables provision of a graft copolymer and thermoplastic resin composition having excellent surface gloss and mechanical properties, by controlling the contents, addition time points, and types of a crosslinking agent, an emulsifier, and a molecular weight regulator when a conjugated diene monomer, the crosslinking agent, the molecular weight regulator, and the emulsifier are polymerized, a method of preparing the rubbery polymer, and a graft copolymer and thermoplastic resin composition including the rubbery polymer.

BACKGROUND ART

In general, thermoplastic resins have relatively satisfactory impact resistance, mechanical strength, moldability, gloss, and the like. Accordingly, thermoplastic resins have been widely applied to electric components, electronic components, office equipment, automobile components, and the like.

An acrylonitrile-butadiene-styrene (ABS) resin, as a representative thermoplastic resin, includes a rubbery polymer having superior rubbery properties as a main ingredient. Here, a representative example of the rubbery polymer is polybutadiene having superior rubbery characteristics, as an impact modifier. The rubbery polymer is prepared through emulsion polymerization. The prepared rubbery polymer is mixed with an aromatic vinyl compound and a vinyl cyanide compound, followed by graft polymerization. As a result, a graft copolymer and a thermoplastic resin composition including the same may be provided.

Emulsion polymerization has advantages in that a process may be easily modified according to a primarily required quality level and, simultaneously, various products may be manufactured when a product generated in a powder form is kneaded with various matrix resins (SA, PC, PBT, PVC, and the like) and additives (a flame retardant, a weather resistant stabilizer, an antistatic agent, an antimicrobial agent, and the like) via an extrusion process.

Meanwhile, when a rubbery polymer is prepared using emulsion polymerization, polymerization time is closely related to particle size of the rubbery polymer. Particularly, a long polymerization time is required to obtain a rubbery polymer having a large particle diameter. Accordingly, to obtain a rubbery polymer having a large particle diameter within a relatively short period, a method of adding an emulsifier, a vinyl cyanide compound, and the like in small amounts before polymerization initiation, a method of continuously adding an emulsifier, and the like have been proposed. However, these methods also require a reaction time of 30 hours or more, and thus, exhibit low productivity.

In practice, when emulsion polymerization is performed under short reaction time and high reaction temperature conditions, a particle diameter of a rubbery polymer is decreased and a generation amount of a coagulated reaction product increases. In addition, reaction pressure is increased due to excessive reaction heat, whereby stability is low during a mass production process. Accordingly, it is not easy to produce a rubbery polymer having a large particle diameter at a high conversion rate within a short reaction time.

In addition, in the case of a thermoplastic resin composition prepared according to a conventional method in which a graft copolymer including a rubbery polymer having a large particle diameter is used, there is a limitation in increasing surface gloss, and impact strength decrease at low temperature is severe. To address these problems, a thermoplastic resin composition is prepared by mixing a large-diameter rubbery polymer with a small-diameter rubbery polymer. In this case, although relatively high impact strength at low temperature, and high surface gloss are exhibited, a process is complex and costs increase because a large-diameter rubbery polymer and a small-diameter rubbery polymer are separately prepared and then a mixing process is included. In addition, due to a small-diameter rubbery polymer used from an initial reaction step, there is a limitation in particle diameter control.

Accordingly, there is still a need for a graft copolymer that addresses the aforementioned disadvantages while including a large-diameter rubbery polymer and a small-diameter rubbery polymer in consideration of productivity and properties, and a technology for obtaining properties of a thermoplastic resin composition including the graft copolymer.

[Patent Document] KR0749657 B1

DISCLOSURE

Technical Problem

Therefore, the present invention has been made in view of the above problems, and it is one object of the present invention to provide a method of preparing a rubbery polymer wherein polymerization is performed such that a large-diameter rubbery polymer and a small-diameter rubbery polymer are formed in a desired ratio at a specific time point during a preparation process of the large-diameter rubbery polymer by controlling the contents, addition time points, and types of a crosslinking agent, a monomer, an emulsifier, and a molecular weight regulator when the conjugated diene monomer, the crosslinking agent, the molecular weight regulator, and the emulsifier are polymerized and, when the prepared rubbery polymer is included in a graft copolymer and a thermoplastic resin composition, improved surface gloss and mechanical properties are provided.

It is another object of the present invention to provide a rubbery polymer in which a large-diameter rubbery polymer and a small-diameter rubbery polymer are formed in a desired ratio according to the method.

It is yet another object of the present invention to provide a graft copolymer including the rubbery polymer, and a thermoplastic resin composition including the graft copolymer and providing excellent surface gloss and mechanical properties.

The above and other objects can be accomplished by the present disclosure described below.

Technical Solution

In accordance with one aspect of the present invention, provided is a method of preparing a rubbery polymer, wherein a conjugated diene monomer, a crosslinking agent, a molecular weight regulator, and an emulsifier are polymerized, wherein the crosslinking agent is a compound represented by Formula 1 below and is added in an amount of 0.05 to 0.5 parts by weight before polymerization initiation or when a polymerization conversion rate is 30% or less:

$$[CH_2=CR^1CO_2(R^2O)nR^3]mC(R^4)l$$ [Formula 1]

(wherein $R^1$ is hydrogen or an alkyl group selected from $C_1$ to $C_3$ alkyl groups, $R^2$ is an alkylene group selected from $C_1$ to $C_4$ alkylene groups, $R^3$ is an alkylene group selected independently from $C_1$ to $C_3$ alkylene groups, $R^4$ is an alkyl group selected from $C_1$ to $C_3$ alkyl groups, l is an integer of 0 to 2, n is an integer of 4 to 15, m is an integer of 3 or 4, and the product of m and n is 12 to 60), the molecular weight regulator is added in an amount of 0.01 parts by weight or more and less than 0.25 parts by weight at a polymerization conversion rate of 40% to 75%, and the emulsifier is an emulsifier having a critical micelle concentration (CMC) of 150 mg/L or less and is added at a polymerization conversion rate of 50% to 85%.

In accordance with another aspect of the present invention, there is provided a rubbery polymer including an in-situ bimodal rubbery polymer having average particle diameters of 2,600 to 5,000 Å and 20 to 70 nm, wherein a weight ratio of a rubbery polymer portion having the average particle diameter of 2,600 to 5,000 Å to a rubbery polymer portion having the average particle diameter of 20 to 70 nm is 98:2 to 99.9:0.1.

In accordance with another aspect of the present invention, there is provided a vinyl cyanide monomer-conjugated diene rubber-aromatic vinyl monomer graft copolymer, wherein the vinyl cyanide monomer-conjugated diene rubber-aromatic vinyl monomer graft copolymer is a graft copolymer of a vinyl cyanide monomer, a conjugated diene rubber, and an aromatic vinyl monomer, wherein the conjugated diene rubber is included in an amount of 40 to 70% by weight; the aromatic vinyl monomer is included in an amount of 20 to 50% by weight; and the vinyl cyanide monomer is included in an amount of 10 to 40% by weight, wherein the conjugated diene rubber is the rubbery polymer.

In accordance with yet another aspect of the present invention, there is provided a thermoplastic resin composition including 5 to 70% by weight of the graft copolymer according to claim 21; and 30 to 95% by weight of an aromatic vinyl compound-vinyl cyanide compound copolymer.

Advantageous Effects

As apparent from the fore-going, the present invention advantageously provides a rubbery polymer in which a large-diameter rubbery polymer and a small-diameter rubbery polymer are formed in a desired ratio by controlling the contents, addition time points, and types of a crosslinking agent, an emulsifier, and a molecular weight regulator when a conjugated diene monomer, the crosslinking agent, the molecular weight regulator, and the emulsifier are polymerized, and a graft copolymer and thermoplastic resin composition having excellent surface gloss and mechanical properties.

Best Mode

Hereinafter, the present invention is described in detail.

By a method of preparing a rubbery polymer according to the present disclosure, a rubbery polymer, in which a large-diameter rubbery polymer and a small-diameter rubbery polymer are formed in a desired ratio and which enables provision of a graft copolymer and thermoplastic resin composition having excellent surface gloss and mechanical properties, by controlling the contents, addition time points, and types of a crosslinking agent, an emulsifier, and a molecular weight regulator when a conjugated diene monomer, the crosslinking agent, the molecular weight regulator, and the emulsifier are polymerized is prepared.

The method of preparing a rubbery polymer is characterized in that a conjugated diene monomer, a crosslinking agent, a molecular weight regulator, and an emulsifier are polymerized, wherein the crosslinking agent is a compound represented by Formula 1 below and is added in an amount of 0.05 to 0.5 parts by weight before polymerization initiation or when a polymerization conversion rate is 30% or less:

$$[CH_2=CR^1CO_2(R^2O)nR^3]mC(R^4)l$$ [Formula 1]

(wherein $R^1$ is hydrogen or an alkyl group selected from $C_1$ to $C_3$ alkyl groups, $R^2$ is an alkylene group selected from $C_1$ to $C_4$ alkylene groups, $R^3$ is an alkylene group selected independently from $C_1$ to $C_3$ alkylene groups, $R^4$ is an alkyl group selected from $C_1$ to $C_3$ alkyl groups, l is an integer of 0 to 2, n is an integer of 4 to 15, m is an integer of 3 or 4, and the product of m and n is 12 to 60), the molecular weight regulator is added in an amount of 0.01 parts by weight or more and less than 0.25 parts by weight at a polymerization conversion rate of 40% to 75%, and the emulsifier is an emulsifier having a critical micelle concentration (CMC) of 150 mg/L or less and is added at a polymerization conversion rate of 50% to 85%.

The conjugated diene monomer may be, for example, one or more selected from the group consisting of 1,3-butadiene, 2,3-dimethyl-1,3-butadiene, 2-ethyl-1,3-butadiene, 1,3-pentadiene, isoprene, chloroprene, piperylene, and the like.

The conjugated diene monomer may be split-added into multiple stages. For example, the conjugated diene monomer may be split-added before polymerization initiation, at a polymerization conversion rate of 30% to 40%, and at a polymerization conversion rate of 60% to 70%, respectively. A rubbery polymer having a suitable particle diameter may be easily formed by adding the conjugated diene monomer into multiple stages considering a polymerization conversion rate.

The polymerization may further include an aromatic vinyl monomer, a vinyl cyanide monomer, or a combination thereof.

The aromatic vinyl monomer may be, for example, one or more selected from the group consisting of styrene, α-methyl styrene, m-methyl styrene, p-methyl styrene, p-tert-butyl styrene, and the like.

The vinyl cyanide monomer may be one or more selected from the group consisting of acrylonitrile, methyl acrylonitrile, ethyl acrylonitrile, isopropyl acrylonitrile, and the like.

When the aromatic vinyl monomer, the vinyl cyanide monomer, or a combination thereof is included along with the conjugated diene monomer, the conjugated diene monomer may be included, for example, in an amount of 55 to 99.8% by weight, 55 to 95% by weight, or 60 to 90% by weight, the aromatic vinyl monomer may be included, for example, in an amount of 0.1 to 40% by weight, 1.5 to 22.5% by weight, or 5 to 20% by weight, and the vinyl cyanide monomer may be included, for example, in an amount of 0.1 to 40% by weight, 2.5 to 22.5% by weight, or 5 to 20% by weight, based on a total weight of used monomers. Within this range, superior polymerization stability, mechanical properties, and gloss properties are provided.

For example, 60 to 75 parts by weight of a conjugated diene monomer, 0.05 to 3 parts by weight of an emulsifier, 0.01 to 1 part by weight of an initiator, 0.01 to 3 parts by weight of an electrolyte, 0.1 to 1 part by weight of a molecular weight regulator, and 30 to 200 parts by weight of ion exchanged water may be included in the polymerization and the polymerization may be initiated at 65 to 70° C., or 66 to 70° C. In this case, the conjugated diene monomer may be sufficiently polymerized.

The initiator may be, for example, one or more selected from the group consisting of potassium persulfate, sodium persulfate, ammonium persulfate, cumene hydroperoxide, diisopropylbenzene hydroperoxide, azobisisobutyronitrile, tertiary butyl hydroperoxide, para-methane hydroperoxide, and benzoyl peroxide.

As another example, an oxidation-reduction catalyst, such as sodium formaldehyde sulfoxylate, sodium ethylenediamine tetraacetate, ferrous sulfate, dextrose, sodium pyrophosphate, or sodium sulfite, may be used as the initiator.

The initiator may be included, for example, in an amount of 0.01 to 1 part by weight, 0.01 to 0.7 parts by weight, or 0.2 to 0.4 parts by weight, based on 100 parts by weight of a total of the monomers used in the polymerization. Within this range, the polymerization may be efficiently performed.

The electrolyte may be, for example, one or more selected from the group consisting of KCl, NaCl, KHCO$_3$, NaHCO$_3$, K$_2$CO$_3$, Na$_2$CO$_3$, KHSO$_3$, NaHSO$_3$, Na$_2$S$_2$O$_7$, K$_4$P$_2$O$_7$, K$_3$PO$_4$, Na$_3$PO$_4$, K$_2$HPO$_4$, and Na$_2$HPO$_4$.

The electrolyte may be included, for example, in an amount of 0.01 to 3 parts by weight or 0.2 to 3 parts by weight based on 100 parts by weight of a total of the monomers used in the polymerization.

A CMC value of the emulsifier might not be specified. For example, the emulsifier may be one or more selected from the group consisting of alkyl ester sulfonated due to inclusion of sodium lauryl sulfate having a CMC of 530 mg/L, sodium alkylbenzene sulfonate, sodium dodecyl allyl sulfosuccinate, sodium acrylamido stearate, polyoxyethylene alkyl ether sulfate ester ammonium salt, C$_{16}$ to C$_{18}$ alkenyl succinic acid di-potassium salt, polyoxyethylene alkyl phenyl ether, polyoxyethylene alkylphenyl ether ammonium sulfate, potassium rosinate, sodium rosinate, fatty acid soap, potassium oleate, and sodium oleate.

The emulsifier may be included in an amount of 0.05 to 3 parts by weight or 1 to 3 parts by weight based on 100 parts by weight of a total of the monomers used in the polymerization. Within this range, emulsion polymerization may be effectively performed.

The molecular weight regulator, which is added before initiation of the polymerization, may be one or more selected from the group consisting of, for example, n-decyl mercaptan, n-dodecyl mercaptan, t-dodecyl mercaptan, and n-octadecyl mercaptan.

The molecular weight regulator, which is added before initiation of the polymerization, may be included, for example, in an amount of 0.1 to 1 part by weight or 0.1 to 0.5 parts by weight based on 100 parts by weight of a total of the monomers used in the polymerization.

In Equation 1 representing the crosslinking agent of the present disclosure which is added before polymerization initiation or when a polymerization conversion rate is 30% or less, for example, $R^1$ is H or $CH_3$, $R^2$ is $C_2H_4$ or $C_3H_6$, $R^3$ is $CH_2$, $R^4$ is $C_2H_5$, l is an integer of 0 to 2, n is an integer of 4 to 15, m is an integer of 3 or 4, and the product of m and n is 12 to 60. In this case, surface gloss and mechanical properties may be provided.

As another example, in Equation 1, $R^1$ is H or $CH_3$, $R^2$ is $C_2H_4$ or $C_3H_6$, $R^3$ is $CH_2$, $R^4$ is $C_2H_5$, l is an integer of 0 to 1, n is an integer of 4 to 10, m is an integer of 3 or 4, and the product of m and n is 12 to 40. In this case, excellent surface gloss is provided and mechanical properties are improved.

As another example, in Equation 1, $R^1$ may be H or $CH_3$, $R^2$ may be $C_2H_4$ or $C_3H_6$, $R^3$ may be $CH_2$, $R^4$ may be $C_2H_5$, l may be an integer of 0 to 1, n may be an integer of 4 to 10, m may be 3, and the product of m and n may be 12 to 30. Within this range, surface gloss and mechanical properties may be improved and polymerization stability may be excellently improved. In particular, impact strength is excellently improved. Here, when the product of m and n is 15, impact strength increase and rubber latex stability may be provided together, and thus, maximized effect may be exhibited.

The crosslinking agent may be included, for example, in an amount of 0.05 to 0.5 parts by weight, or 0.1 to 0.35 parts by weight based on 100 parts by weight of a total of the monomers used in the polymerization. Within this range, superior surface gloss, mechanical properties, and the like are provided. In addition, when the content of the crosslinking agent is less than 0.05 parts by weight, impact strength increase effect is small or is hardly exhibited. On the other hand, when the content of the crosslinking agent is greater than 0.5 parts by weight, rubber latex stability may be deteriorated.

In the polymerization, for example, 10 to 20 parts by weight of the conjugated diene monomer and 0.1 to 1.0 part by weight of the emulsifier may be added batchwise or continuously at a polymerization conversion rate of 30% to 40%.

The polymerization may be performed, for example, at 72 to 75° C., or 72 to 74° C. In this case, the polymerization may be performed while increasing temperature with respect to a polymerization initiation temperature as the polymerization proceeds. In this case, polymerization efficiency may be improved.

A CMC value of the emulsifier might not be specified. For example, the emulsifier may be one or more selected from the group consisting of alkyl ester sulfonated due to inclusion of sodium lauryl sulfate having a CMC of 530 mg/L, sodium alkylbenzene sulfonate, sodium dodecyl allyl sulfosuccinate, sodium acrylamido stearate, polyoxyethylene alkyl ether sulfate ester ammonium salt, C$_{16}$ to C$_{18}$ alkenyl succinic acid di-potassium salt, polyoxyethylene alkyl phenyl ether, polyoxyethylene alkylphenyl ether ammonium sulfate, potassium rosinate, sodium rosinate, fatty acid soap, potassium oleate, and sodium oleate.

The emulsifier may be included, for example, in an amount of 0.1 to 1 part by weight or 0.1 to 0.5 parts by weight based on 100 parts by weight of a total of the monomers used in the polymerization. Within this range, emulsion polymerization may be effectively performed.

In the present disclosure, the molecular weight regulator, which is added at a polymerization conversion rate of 40% to 75%, preferably 45% to 65%, may be, for example, one or more selected from the group consisting of n-octyl mercaptan, sec-octyl mercaptan, n-nonyl mercaptan, n-decyl mercaptan, n-dodecyl mercaptan, t-dodecyl mercaptan, and n-octadecyl mercaptan.

The molecular weight regulator may be included, for example, in an amount of 0.01 parts by weight or more and less than 0.25 parts by weight, 0.01 to 0.15 parts by weight, or 0.1 to 0.15 parts by weight based on 100 parts by weight of a total of the monomers used in the polymerization. Within this range, high mechanical properties are provided without decrease in a reaction rate.

For reference, when the molecular weight regulator added before polymerization initiation has the same chain length as the molecular weight regulator added at a polymerization conversion rate of 40% to 75%, it is preferred to add a preceding substance among tert, iso, and normal substances before the polymerization initiation and adding the remainder at the polymerization conversion rate of 40% to 75%, when a reaction rate and polymerization stability are considered.

On the other hand, when the molecular weight regulator, which is added before polymerization initiation, and the molecular weight regulator, which is added at a polymerization conversion rate of 40% to 75%, have different chain lengths, it is preferred to adding a substance having a low radical consumption rate before the polymerization initiation and then adding a substance having a high radical consumption rate at the polymerization conversion rate of 40% to 75%, when a reaction rate and polymerization stability are considered.

As a particular example, when t-dodecyl mercaptan (TDDM) is added before the polymerization initiation, a preferred example of a molecular weight regulator added at the polymerization conversion rate of 40% to 75% includes t-dodecyl mercaptan (TDDM), n-dodecyl mercaptan (NDDM), and decyl mercaptan (DM).

In the present disclosure, when an emulsifier having a CMC of 150 mg/L or less is separately added at a polymerization conversion rate of 50% to 85%, superior polymerization stability is provided, a polymerization rate increases, and surface gloss of a thermoplastic resin is improved.

The emulsifier having a CMC of 150 mg/L or less may include an emulsifier having a CMC of 10 mg/L or less or an emulsifier having a CMC of greater than 10 mg/L and 150 mg/L or less.

In particular, the emulsifier having a CMC of 10 mg/L or less may be added in an amount of 0.01 to 0.3 parts by weight, or 0.1 to 0.3 parts by weight, at a polymerization conversion rate of 60% to 85%, based on 100 parts by weight of a total of the monomers used in the polymerization. Here, as representative examples of the emulsifier having a CMC of 10 mg/L or less, there are $C_{16}$ to $C_{18}$ alkenyl succinic acid di-potassium salt, polyoxyethylene alkyl phenyl ether, polyoxyethylene alkylphenyl ether ammonium sulfate, and the like.

In addition, the emulsifier having a CMC of greater than 10 mg/L and 150 mg/L or less may be added in an amount of 0.05 parts by weight to 0.5 parts by weight, or 0.1 to 0.4 parts by weight, at a polymerization conversion rate of 50% to 85%, based on 100 parts by weight of a total of the monomers used in the polymerization. In this case, as representative examples of the emulsifier having a CMC of greater than 10 mg/L and 150 mg/L or less, there are fatty acid soap, potassium oleate, sodium oleate, and the like.

The critical micelle concentration (CMC) is measured by means of a tensiometer. In particular, surface tension is measured and investigated while varying the concentration of an emulsifier in distilled water.

The emulsifier may be included, for example, in a total use amount of 0.01 to 0.5 parts by weight or 0.1 to 0.5 parts by weight based on 100 parts by weight of a total of the monomers used in the polymerization. When the amount of the emulsifier is greater than 0.5 parts by weight during entire polymerization, a small low-temperature impact strength width and high gloss may be secured. However, property deterioration, such as impact strength decrease compared to conventional cases, may occur with decrease in an average particle diameter due to increase in a generation ratio of small-diameter particles, and reaction stability may be decreased due to viscosity increase during polymerization. On the other hand, when a total use amount of the emulsifier is less than 0.01 parts by weight, a generation ratio of small-diameter particles is small or the emulsifier is used to stabilize particles having a conventional diameter, whereby it may be difficult to exhibit desired effect.

In addition, when a conversion rate at an addition time point of the emulsifier is low, e.g., less than 50%, a generation rate of small-diameter rubber latex increases, whereby it may be difficult to anticipate high gloss and a small low-temperature impact strength decrease width. On the other hand, when a conversion rate at an addition time point is, for example, greater than 85%, the content of monomers not participating reaction is low, whereby a generation ratio of small-diameter particles is small or the emulsifier is used to stabilize particles having a conventional diameter, as in the case in which the emulsifier is added in an amount smaller than a suitable amount. Accordingly, it may be difficult to exhibit desired effect.

Meanwhile, when an emulsifier having a high CMC, e.g., greater than 150 mg/L, (ex. sodium lauryl sulfate having a CMC of 530 mg/L) is included, it is not easy to simultaneously prepare a large-diameter rubber latex and small-diameter rubber latex.

In the polymerization, for example, 5 to 30 parts by weight of the conjugated diene monomer and 0 to 1 part by weight of the emulsifier may be added batchwise or continuously at a polymerization conversion rate of 60% to 70%.

The polymerization may be performed, for example, at 80 to 85° C., or 81 to 84° C. In this case, the polymerization may be performed while gradually increasing temperature, with respect to a polymerization initiation temperature and a temperature at a polymerization conversion rate of 30% to 40%, as polymerization proceeds, thereby providing a sufficient polymerization efficiency.

The emulsifier may be, for example, one or more selected from the group consisting of sulfonated alkyl ester, sodium lauryl sulfate, sodium alkylbenzene sulfonate, sodium dodecyl allyl sulfosuccinate, sodium acrylamido stearate, polyoxyethylene alkyl ether sulfate ester ammonium salt, $C_{16}$ to $C_{18}$ alkenyl succinic acid di-potassium salt, polyoxyethylene alkyl phenyl ether, polyoxyethylene alkylphenyl ether ammonium sulfate, potassium rosinate, sodium rosinate, fatty acid soap, potassium oleate, and sodium oleate.

The emulsifier may be included in an amount of 0 to 1 part by weight, 0.1 to 1 part by weight or 0.1 to 0.5 parts by weight based on 100 parts by weight of a total of the monomers used in the polymerization. Within this range, emulsion polymerization may be effectively performed.

In the polymerization, the ion exchanged water may be included, for example, in an amount of 30 to 200 parts by weight, 50 to 150 parts by weight, or 50 to 100 parts by weight based on 100 parts by weight of a total of the conjugated diene monomer used in the polymerization. Within this range, polymerization efficiency may be improved.

The rubbery polymer may be polymerized, for example, at a polymerization conversion rate of 92% or more or a polymerization conversion rate of 92.5% or more. Within this range, productivity is superior.

As discussed above, the method of the present disclosure is characterized by adding 0.05 to 0.5 parts by weight of the crosslinking agent represented by Equation 1 before polymerization initiation or at a polymerization conversion rate of 30% or less, adding 0.01 parts by weight or more and less than 0.25 parts by weight of a mercaptan-based molecular weight regulator having a $C_8$ or more alkyl group at a polymerization conversion rate of 40% to 75%, irrespective of a molecular weight regulator added before polymerization initiation, and adding about 0.01 parts by weight to 0.5 parts by weight of an emulsifier having a low CMC at a polymerization conversion rate of 50% to 85%, whereby the properties of a thermoplastic resin may be changed. That is, since a large-diameter rubber latex and a small-diameter rubber latex may be simultaneously prepared, increase in a gel content may be inhibited while increasing a polymerization conversion rate. Accordingly, a thermoplastic resin having improved low-temperature impact strength and surface gloss while maintaining conventional impact strength may be prepared. Meanwhile, although a small-diameter latex is slightly observed on a TEM analysis image of the rubber latex or by means of a particle diameter measurement apparatus, an average particle diameter thereof and the like are not greatly changed.

The rubbery polymer of the present disclosure includes, for example, an in-situ bimodal rubbery polymer having an average particle diameter of 20 to 70 nm, or 30 to 70 nm while having an average particle diameter of 2,600 to 5,000 Å, or 3,000 to 3,500 Å. Here, a weight ratio of a rubbery polymer portion having the average particle diameter of 2,600 to 5,000 Å to a rubbery polymer portion having the average particle diameter of 20 to 70 nm may be 98:2 to 99.9:0.1, or 98:2 to 99:1. Within this range, limitation in a particle diameter is resolved, and a graft copolymer provides excellent surface gloss and mechanical properties while providing polymerization stability.

In the present disclosure, the in-situ bimodal rubbery copolymer refers a rubbery polymer bimodalized by single polymerization, and is distinguished from a rubbery polymer prepared by physically mixing two rubbery copolymers having different average particle diameters.

With regard to the rubbery polymer, a gel content representing the degree of cross-linking in the polymer, i.e., a cross-linking degree of the polymer, may be, for example, 70 to 84% by weight, or 72 to 80% by weight. In addition, the cross-linking degree of the polymer increases with increasing gel content value.

The rubbery polymer may have, for example, a coagulum content of 0.01 to 0.7% by weight, or 0.01 to 0.5% by weight. Within this range, excellent polymerization stability may be provided.

With regard to the vinyl cyanide monomer-conjugated diene rubber-aromatic vinyl monomer graft copolymer of the present disclosure, for example, the conjugated diene rubber is included in an amount of 40 to % by weight, or 45 to 70% by weight; the aromatic vinyl monomer is included in an amount of 20 to 50% by weight, or 20 to 30% by weight; and the vinyl cyanide monomer is included in an amount of 10 to 40% by weight, or 10 to 20% by weight, wherein the conjugated diene rubber is the rubbery polymer. Within this range, mechanical properties such as surface gloss, impact strength, and low-temperature impact strength are improved.

The copolymer may have, for example, a graft rate of 25 to 55%, or 30 to 45%. Within this range, polymerization stability, surface gloss, and mechanical properties are improved.

When the graft copolymer is graft polymerized, for example, an emulsifier, an initiator, a molecular weight regulator, and a redox-based catalyst may be further included.

the emulsifier, the initiator, the molecular weight regulator, and the redox-based catalyst are specifically limited so long as they have been generally used to prepare a graft copolymer, and may be selectively used as needed.

The emulsifier may be, for example, one or more selected from the group consisting of sodium lauryl sulfate, sulfonated alkyl ester, sodium alkylbenzene sulfonate, sodium dodecyl allyl sulfosuccinate, sodium acrylamido stearate, polyoxyethylene alkyl ether sulfate ester ammonium salt, $C_{16}$ to $C_{18}$ alkenyl succinic acid di-potassium salt, polyoxyethylene alkyl phenyl ether, polyoxyethylene alkylphenyl ether ammonium sulfate, potassium rosinate, sodium rosinate, fatty acid soap, potassium oleate, and sodium oleate.

The emulsifier may be used in an amount of 0.1 to 3 parts by weight.

The redox-based catalyst may be, for example, one or more selected from the group consisting of ferrous sulfate, dextrose, sodium pyrophosphate, sodium sulfite, sodium formaldehyde sulfoxylate, and sodium ethylenediamine tetraacetate.

As a particular example, the redox-based catalyst may include 0.0001 to 0.002 parts by weight of ferrous sulfate, 0.01 to 0.2 parts by weight of dextrose, and 0.01 to 0.001 parts by weight of sodium pyrophosphate.

In addition, as needed, additives such as a chelating agent, a dispersant, a pH regulator, an oxygen scavenger, a particle diameter regulator, an anti-aging agent, and an oxygen scavenger may be additionally used, and the polymerization may be generally performed at 10 to 90° C., or 25 to 85° C.

The graft copolymer of the present disclosure may be provided, for example, in a form of a graft copolymer powder by coagulating, aging, dehydrating, and drying the graft copolymer latex.

The coagulating, aging, dehydrating, and drying methods are not specifically limited so long as they have been generally used for graft polymerization.

During the coagulation, for example, an antioxidant may be added to the latex. In this case, oxidation prevention effect is maximized without deterioration of other properties.

A thermoplastic resin composition according to the present disclosure includes the graft copolymer of the present disclosure.

The thermoplastic resin composition may include, for example, the graft copolymer; and the aromatic vinyl compound-vinyl cyanide compound copolymer.

The graft copolymer may be included, for example, in an amount of 5 to 70% by weight or 20 to 60% by weight; and the aromatic vinyl compound-vinyl cyanide compound copolymer may be included, for example, in an amount of 30 to 95% by weight or 40 to 80% by weight. Within this range, mechanical properties and gloss properties are superior.

The aromatic vinyl compound-vinyl cyanide compound copolymer may have, for example, a weight average molecular weight of 80,000 to 150,000 g/mol, 90,000 to 130,000 g/mol, or 100,000 to 120,000 g/mol. Within this range, superior kneading property to the graft copolymer is exhibited and thus superior gloss, surface characteristics, and processability are exhibited.

The aromatic vinyl compound-vinyl cyanide compound copolymer may include, for example, 20 to 35% by weight or 25 to 30% by weight of a vinyl cyanide compound.

The thermoplastic resin composition may further include, for example, one or more selected from the group consisting of an antioxidant, lubricant and a heat stabilizer.

The antioxidant may be added, for example, in an amount of 0.05 to 5 parts by weight, 0.05 to 2 parts by weight, or 0.1 to 1 part by weight based on 100 parts by weight of a total of the graft copolymer and the aromatic vinyl compound-vinyl cyanide compound copolymer. Within this range, oxidation prevention effect is maximized without affecting other properties.

The antioxidant may be added, for example, to the latex before or during the coagulation after polymerization of the graft copolymer. In this case, oxidation prevention effect may be maximized without affecting other properties.

The lubricant may be added, for example, in an amount of 0.1 to 5 parts by weight, 0.5 to 2 parts by weight, or 0.5 to 1.5 parts by weight based on 100 parts by weight of a total of the graft copolymer and the aromatic vinyl compound-vinyl cyanide compound copolymer. Within this range, processability is maximized without affecting other properties.

The heat stabilizer may be added, for example, in an amount of 0.01 to 2 parts by weight, 0.05 to 1 part by weight, or 0.05 to 0.5 parts by weight based on 100 parts by weight of a total of the graft copolymer and the aromatic vinyl compound-vinyl cyanide compound copolymer. Within this range, thermal stability is maximized without affecting other properties.

A rubber content in the thermoplastic resin composition may be, for example, 10 to 30% by weight, 15 to 25% by weight, or 15 to 20% by weight. Within this range, mechanical properties, such as impact strength, gloss properties, and surface characteristics are superior.

The thermoplastic resin composition may be prepared by melt-kneading and extruding a powder of the graft copolymer with the aromatic vinyl compound-vinyl cyanide compound copolymer.

The melt-kneading and extruding are not specifically limited so long as they are generally used for graft-polymerization.

Before or during the melt-kneading, for example, a lubricant, a heat stabilizer, or a combination thereof may be added to the graft copolymer powder and the aromatic vinyl compound-vinyl cyanide compound copolymer. In this case, processability and/or thermal stability are improved without deterioration of other properties.

A molded article may be manufactured from the thermoplastic resin composition. The molded article may be, for example, an injection-molded article or an extrusion-molded product.

Now, the present invention will be described in more detail with reference to the following preferred examples. However, these examples are provided for illustrative purposes only. Those skilled in the art will appreciate that various modifications, additions and substitutions are possible, without departing from the scope and spirit of the invention. Therefore, it is obvious that the modifications, additions and substitutions are within the scope of the present invention.

EXAMPLE

Example 1

<Preparation of Rubbery Polymer>

65 parts by weight of ion exchanged water, 70 parts by weight of 1,3-butadiene as a monomer, 1.5 parts by weight of potassium rosinate, 0.8 parts by weight of potassium oleate, 0.8 parts by weight of potassium carbonate, 0.3 parts by weight of tertiary dodecyl mercaptan (TDDM) as a molecular weight regulator, 0.3 parts by weight of potassium persulfate ($K_2S_2O_8$), and 0.1 parts by weight of a compound represented by Equation 1a below as a crosslinking agent were fed into a nitrogen-substituted polymerization reactor (autoclave) batchwise, and reaction was performed at 70° C.:

$$[CH_2\!=\!CR^1CO_2(R^2O)nR^3]mC(R^4)] \qquad \text{[Equation 1a]}$$

wherein $R^1$ is H, $R^2$ is $C_2H_4$, $R^3$ is $CH_2$, $R^4$ is $C_2H_5$, l is 1, n is 5, and m is 3.

Subsequently, 20 parts by weight of 1,3-butadiene and 0.15 parts by weight of potassium rosinate were added batchwise at a polymerization conversion rate of 30%, and reaction was performed at 75° C. 0.1 parts by weight of tertiary dodecyl mercaptan (TDDM), as a molecular weight regulator, was added thereto at a polymerization conversion rate of 52%, and reaction was performed until a polymerization conversion rate reached 60%. In addition, 0.35 parts by weight of potassium oleate having a CMC of 35 mg/L was added at a polymerization conversion rate of 61%, the remainder of 1,3-butadiene (15 parts by weight) was added batchwise, and temperature was elevated up to 82° C., thereby preparing a rubbery polymer which had a polymerization conversion rate of 92.7%, a particle diameter of 3,125 Å, a gel content of 75%, and in which a weight ratio of a large-diameter rubbery polymer to a small-diameter rubbery polymer (average particle diameter: 30 to 70 nm) was 98:2. A total reaction time was 21 hours and a generated coagulum content was 0.03%.

The prepared rubbery polymer was analyzed as follows:

1) Polymerization conversion rate (%): 1.5 g of a prepared latex was dried for 15 minutes in a 150 t hot air dryer, and then the weight thereof was measured to find a total solid content (TSC). A polymerization conversion rate was calculated according to Equation 1 below:

Polymerization conversion rate (%)=(Parts by weight of added monomer and supplementary substances−parts by weight of added supplementary substances excluding monomer)×total solid content/100     [Equation 1]

2) Average particle diameter: Measured by means of a Nicomp™ 380 instrument (manufactured by PSS•Nicomp, US) according to a dynamic laser light scattering method.

3) Gel content: A rubbery polymer was solidified using a dilute acid or a metal salt and then washed, followed by drying in a 60° C. vacuum oven for 24 hours. An obtained rubber lump was thinly cut with scissors. 1 g of a rubber piece was immersed in 100 g of toluene and stored in a room-temperature dark room for 48 hours, followed by separating into a sol and gel. A separated gel portion was dried in an 85° C. oven for six hours. Subsequently, a gel content was measured according to Equation 2 using the weight of the dried gel:

Gel content (% by weight)=Weight of insoluble matter (gel)/weight of sample×100 [Equation 2]

4) Average particle diameters of small-diameter rubbery polymer and large-diameter rubbery polymer and ratio thereof: Measured using a counted analysis value for each particle diameter by means of TEM analysis equipment (JEM-1400, manufactured by Jeol).

5) Coagulum content: An index of polymerization stability; calculated according to Equation 3 below:

Solid coagulum (% by weight)=(Weight of generated coagulum in reaction tank (g)/total weight of rubber and monomer (g))×100 [Equation 3]

When the weight of the solid coagulum is 0.7% by weight or more, latex stability is greatly decreased and a large amount of coagulum is generated, whereby it is difficult to obtain a suitable graft copolymer.

<Preparation of Graft Copolymer>

65 parts by weight of the rubbery polymer (based on solid content) was fed into a nitrogen-substituted reactor, and an emulsion, which was prepared by mixing 10 parts by weight of acrylonitrile, 25 parts by weight of styrene, 20 parts by weight of ion exchanged water, 0.1 parts by weight of t-butyl hydroperoxide, 1 part by weight of potassium rosinate, and 0.3 parts by weight of tertiary dodecyl mercaptan (TDDM) in a separate mixer, was continuously added thereto over three hours at 70° C. At this time, 0.054 parts by weight of dextrose, 0.004 parts by weight of sodium pyrophosphate, and 0.002 parts by weight of ferrous sulfate were continuously added together.

After adding the monomer emulsion, 0.05 parts by weight of dextrose, 0.03 parts by weight of sodium pyrophosphate, 0.001 parts by weight of ferrous sulfate, and 0.005 parts by weight of t-butyl hydroperoxide were fed batchwise into the reactor, and then temperature was elevated up to 80° C. over one hour, followed by terminating the reaction. Here, an obtained graft copolymer latex had a polymerization conversion rate of 98.5% and a graft rate of 38%.

The prepared graft copolymer latex was analyzed as follows:

6) Graft rate: A graft polymer latex was solidified, washed, and dried, whereby a powder-type graft polymer latex was obtained. 2 g of this obtained powder was added to 300 ml of acetone, followed by stirring for 24 hours. A resultant solution was separated by means of an ultracentrifuge. A separated solution was added dropwise to methanol, thereby obtaining a non-grafted portion. The obtained non-grafted portion was dried at 60 to 120° C. and then the weight thereof was measured. Using the measured weights, a graft rate was calculated according to Equation 4:

Graft rate (% by weight)=(Weight of grafted monomer (g)/weight of rubbery (g))×100 [Equation 4]

A calculated graft rate of less than 25% is not preferred because gloss is decreased.

<Preparation of Thermoplastic Resin Composition>

0.5 parts by weight of IR1076, as an antioxidant, was added to the graft copolymer latex. Subsequently, this resultant mixture and 2.0 parts by weight of $H_2SO_4$ (10% aqueous solution) were added dropwise to a coagulation tank maintained at 85° C. to perform first coagulation. Subsequently, second aging was performed at 97° C., and then dehydration and drying were performed. As a result, a powder-type graft copolymer was obtained. To 26 parts by weight of the obtained graft copolymer, 74 parts by weight of a styrene-acrylonitrile copolymer (LG SAN 92HR) having a weight average molecular weight of 110,000 g/mol and an acrylonitrile content of 27% by weight, 1.0 part by weight of a lubricant, and 0.1 parts by weight of a heat stabilizer were added, and extrusion and injection molding were performed. As a result, a specimen having a final rubber content of 16.5% by weight was manufactured.

Example 2

An experiment was carried out in the same manner as in Example 1, except that, in <Preparation of rubbery polymer> of Example 1, 0.1 parts by weight of n-dodecyl mercaptan (NDDM), as a molecular weight regulator, was added at a polymerization conversion rate of 50%, and potassium oleate having a CMC of 35 mg/L, as an emulsifier, was added at a polymerization conversion rate of 58%.

Example 3

An experiment was carried out in the same manner as in Example 1, except that, in <Preparation of rubbery polymer> of Example 1, 0.1 parts by weight of decyl mercaptan (DM), as a molecular weight regulator, were added at a polymerization conversion rate of 53%, and potassium oleate having a CMC of 35 mg/L, as an emulsifier, was added at a polymerization conversion rate of 62%.

Example 4

An experiment was carried out in the same manner as in Example 1, except that, in <Preparation of rubbery polymer> of Example 1, 0.15 parts by weight of decyl mercaptan (DM), a molecular weight regulator, were added at a polymerization conversion rate of 56%, and potassium oleate having a CMC of 35 mg/L, as an emulsifier, was added at a polymerization conversion rate of 58%.

Example 5

An experiment was carried out in the same manner as in Example 1, except that, in <Preparation of rubbery polymer> of Example 1, a crosslinking agent was added at a polymerization conversion rate of 30%.

Comparative Example 1

An experiment was carried out in the same manner as in Example 1, except that, in <Preparation of rubbery polymer> of Example 1, a crosslinking agent was not added before polymerization initiation, a molecular weight regulator was not added at a polymerization conversion rate of 52%, and an emulsifier was not added at a polymerization conversion rate of 61%.

Comparative Example 2

An experiment was carried out in the same manner as in Example 1, except that, in <Preparation of rubbery polymer> of Example 1, a compound represented by Equation 1b below was used as a crosslinking agent, a molecular weight regulator (TDDM) was not added at a polymerization conversion rate of 52%, and an emulsifier was added at a polymerization conversion rate of 59%:

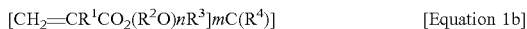  [Equation 1b]

wherein $R^1$ is H, $R^2$ is $C_3H_6$, $R^3$ is $CH_2$, $R^4$ is $C_2H_5$, l=2, n=4, and m=2.

Comparative Example 3

An experiment was carried out in the same manner as in Example 1, except that, in <Preparation of rubbery polymer> of Example 1, 0.25 parts by weight was added at a polymerization conversion rate of 47% and an emulsifier was added at a polymerization conversion rate of 60%.

Comparative Example 4

An experiment was carried out in the same manner as in Example 1, except that, in <Preparation of rubbery polymer> of Example 1, a compound represented by Equation 1c was used as a crosslinking agent, a molecular weight regulator (TDDM) was added at a polymerization conversion rate of 51%, and an emulsifier was added at a polymerization conversion rate of 58%:

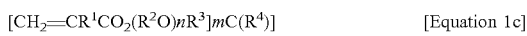  [Equation 1c]

wherein $R^1$ is H, $R^2$ is $C_2H_4$, $R^3$ is $CH_2$, $R^4$ is $C_2H_5$, l=1, n=1, and m=3.

Comparative Example 5

An experiment was carried out in the same manner as in Example 1, except that, in <Preparation of rubbery polymer> of Example 1, an emulsifier was added at a polymerization conversion rate of 60%, and 0.1 parts by weight of a molecular weight regulator (TDDM) were added at a polymerization conversion rate of 80% instead of a polymerization conversion rate of 52%.

Comparative Example 6

An experiment was carried out in the same manner as in Example 1, except that, in <Preparation of rubbery polymer> of Example 1, 0.1 parts by weight of a molecular weight regulator (TDDM) were not added at a polymerization conversion rate of 52%.

Comparative Example 7

An experiment was carried out in the same manner as in Example 1, except that, in <Preparation of rubbery polymer> of Example 1, a crosslinking agent was added at a polymerization conversion rate of 35% instead of before polymerization initiation.

Comparative Example 8

An experiment was carried out in the same manner as in Example 1, except that, in <Preparation of rubbery polymer> of Example 1, sodium lauryl sulfonate having a CMC of 530 mg/L was added, instead of potassium oleate as an emulsifier, at a polymerization conversion rate of 61%.

Comparative Example 9

An experiment was carried out in the same manner as in Example 1, except that the crosslinking agent, which has been added at a polymerization conversion rate of 0%, i.e., before polymerization initiation, was added in an amount of 0.6 parts by weight to prepare a rubbery polymer.

Reference Example 1

An experiment was carried out in the same manner as in Example 1, except that, in <Preparation of rubbery polymer> of Example 1, 0.6 parts by weight of potassium oleate having a CMC of 35 mg/L were added at a polymerization conversion rate of 61%.

Test Example

The properties of a rubbery polymer and graft copolymer prepared according to each of Examples 1 to 5, Comparative Examples 1 to 9, and Reference Example 1 are summarized in Table 1 below. In addition, the properties of the thermoplastic resin composition specimen manufactured according to each of Examples 1 to 5, Comparative Examples 1 to 9, and Reference Example 1 were measured according to the following methods and results thereof are summarized in Table 2 below.

<Properties of Thermoplastic Resin Composition>

7) Izod impact strength (kgf·cm/cm): Measured using a specimen having a thickness of ¼" according to ASTM D256.

8) Surface gloss: Measured at 45° according to ASTM D528.

9) Low-temperature impact strength (kgf·cm/cm): A specimen for measuring Izod impact strength was stored at −20° C. for two hours or more, and then the impact strength thereof was measured in a low-temperature chamber equipped with an impact strength meter.

TABLE 1

| Classification | | | | | | | | | |
|---|---|---|---|---|---|---|---|---|---|
| | | Rubbery polymers | | | | | | Graft copolymers | |
| | Reaction time (hr) | Conversion rate (%) | Particle diameter (Å) | Small diameter (nm) | Large diameter:small diameter (weight ratio) | Gel content (%) | Coagulum (%) | Conversion rate (%) | Graft rate (%) |
| Example 1 | 21 | 92.7 | 3125 | 30-70 | 98:2 | 75 | 0.03 | 98.5 | 38.0 |
| Example 2 | 20.5 | 93.1 | 3085 | 30-70 | 98:2 | 77 | 0.04 | 98.2 | 37.2 |
| Example 3 | 19.5 | 92.8 | 3047 | 30-70 | 98:2 | 75 | 0.03 | 97.9 | 36.0 |
| Example 4 | 20 | 92.5 | 3109 | 30-70 | 98:2 | 78 | 0.03 | 98.6 | 40.1 |
| Example 5 | 20.3 | 92.5 | 3085 | 30-70 | 98:2 | 80 | 0.04 | 98.1 | 37.2 |

TABLE 1-continued

| | Rubbery polymers | | | | | | Graft copolymers | |
|---|---|---|---|---|---|---|---|---|
| Classification | Reaction time (hr) | Conversion rate (%) | Particle diameter (Å) | Small diameter (nm) | Large diameter:small diameter (weight ratio) | Gel content (%) | Coagulum (%) | Conversion rate (%) | Graft rate (%) |
| Comparative Example 1 | 20 | 92.1 | 3050 | — | 100:0 | 81 | 0.02 | 98.5 | 38.1 |
| Comparative Example 2 | 19.7 | 92.5 | 3100 | 30-70 | 98:2 | 84 | 0.03 | 98.6 | 40.1 |
| Comparative Example 3 | 23 | 91.8 | 3120 | 30-70 | 98:2 | 72 | 0.05 | 97.5 | 35.7 |
| Comparative Example 4 | 19 | 93.4 | 3025 | 30-70 | 98:2 | 85 | 0.05 | 98.7 | 38.5 |
| Comparative Example 5 | 22 | 92 | 3085 | 30-70 | 98:2 | 79 | 0.04 | 98.1 | 36.9 |
| Comparative Example 6 | 20 | 93.1 | 3150 | 30-70 | 98:2 | 80 | 0.02 | 97.8 | 39.4 |
| Comparative Example 7 | 21 | 92.5 | 3075 | 30-70 | 98:2 | 78 | 0.06 | 98.4 | 38.1 |
| Comparative Example 8 | 22 | 92.3 | 3008 | — | 100:0 | 75 | 0.02 | 97.9 | 38.7 |
| Comparative Example 9 | 21 | 93.1 | 3056 | 30-70 | 98:2 | 83 | 0.10 | 98.3 | 37.6 |
| Reference Example 1 | 18.8 | 94.1 | 2885 | 30-70 | 96:4 | 80 | 0.03 | 98.5 | 42.0 |

TABLE 2

| | Thermoplastic resin compositions | | |
|---|---|---|---|
| Classification | Impact strength | Gloss | Low-temperature impact |
| Example 1 | 35.7 | 93.2 | 13.2 |
| Example 2 | 38.4 | 93.4 | 13 |
| Example 3 | 35.2 | 94.1 | 13.4 |
| Example 4 | 36.1 | 93.7 | 13.8 |
| Example 5 | 35.4 | 94.1 | 13 |
| Comparative Example 1 | 32 | 88.2 | 10.8 |
| Comparative Example 2 | 33.7 | 93.7 | 12.7 |
| Comparative Example 3 | 36 | 90.8 | 13.1 |
| Comparative Example 4 | 30.7 | 94.3 | 9.8 |
| Comparative Example 5 | 32.7 | 93.1 | 11.9 |
| Comparative Example 6 | 32.4 | 93.4 | 11.4 |
| Comparative Example 7 | 34.7 | 90.1 | 12.2 |
| Comparative Example 8 | 35.1 | 90 | 11.2 |
| Comparative Example 9 | 31.8 | 93.2 | 12.7 |
| Reference Example 1 | 28.9 | 96.5 | 11.5 |

As shown in Tables 1 and 2, it can be confirmed that, in the cases of the thermoplastic resin compositions prepared according to the present disclosure (Examples 1 to 5), a rubber latex including a small-diameter rubbery polymer in a proper ratio during preparation of a rubbery polymer may be obtained while reducing a coagulum content, and a thermoplastic resin composition having superior mechanical properties and surface gloss due to containment of a graft copolymer including the same may be provided.

However, it can be confirmed that, when a crosslinking agent and an emulsifier are not added and a molecular weight regulator is not split-added as in Comparative Example 1, all of impact strength, gloss, and low-temperature impact strength are poor.

In addition, it can be confirmed that, when a branched chain number of a crosslinking agent is not sufficient and a molecular weight regulator is not properly split-added as in Comparative Example 2, impact strength and low-temperature impact strength are decreased.

In addition, it can be confirmed that, when a large amount of molecular weight regulator is split-added as in Comparative Example 3, a reaction time is extended and gloss is poor.

In addition, it can be confirmed that, when a crosslinking agent is unsuitable as in Comparative Example 4, impact strength and low-temperature impact strength are poor.

In addition, it can be confirmed that, when a split addition time point of a molecular weight regulator is unsuitable as in Comparative Example 5, a reaction time is further extended and impact strength and low-temperature impact strength are deteriorated.

In addition, it can be confirmed that, when a molecular weight regulator is not added at a polymerization conversion rate of 40 to 75% as in Comparative Example 6, impact strength, particularly low-temperature impact strength, are decreased.

In addition, it can be confirmed that, when a crosslinking agent is added after a conversion rate of 30% as in Comparative Example 7, a coagulum content increases and low-temperature impact strength and, particularly, gloss are decreased.

In addition, it can be confirmed that, when an emulsifier having a CMC of greater than 150 mg/L is split-added as in Comparative Example 8, a reaction time is further extended, and gloss and low-temperature impact strength are poor due to non-formation of a small-diameter rubbery polymer.

Further, it can be confirmed that, when an addition amount of a crosslinking agent exceeds a proper amount range as in Comparative Example 9, a gel content and a coagulum content remarkably increase, whereby low-temperature impact strength and impact strength are decreased.

Meanwhile, it can be further confirmed that, when the large-diameter rubbery polymer and the small-diameter rubbery polymer of Example 1 are used in a weight ratio of 96:4 as in Reference Example 1, the diameter of a large-diameter particle is limited and impact strength and low-temperature impact strength are poor.

The invention claimed is:

1. A method of preparing a rubbery polymer, wherein a conjugated diene monomer is polymerized in the presence of a crosslinking agent, a molecular weight regulator, and an emulsifier, wherein the crosslinking agent is a compound represented by Formula 1 below and is added before polymerization initiation or when a polymerization conversion rate is 30% or less:

[CH$_2$=CR$^1$CO$_2$(R$^2$O)$n$R$^3$]$m$C(R$^4$)$l$  [Formula 1]

(wherein R$^1$ is hydrogen or an alkyl group selected from C$_1$ to C$_3$ alkyl groups, R$^2$ is an alkylene group selected from C$_1$ to C$_4$ alkylene groups, R$^3$ is an alkylene group selected independently from C$_1$ to C$_3$ alkylene groups, R$^4$ is an alkyl group selected from C$_1$ to C$_3$ alkyl groups, l is an integer of 0 to 2, n is an integer of 4 to 15, m is an integer of 3 or 4, and the product of m and n is 12 to 60), the molecular weight regulator is added at a polymerization conversion rate of 40% to 75%, and the emulsifier is an emulsifier having a critical micelle concentration (CMC) of 150 mg/L or less and is added at a polymerization conversion rate of 50% to 85%.

2. The method according to claim 1, wherein the conjugated diene monomer is split-added before polymerization initiation, at a polymerization conversion rate of 30% to 40%, and at a polymerization conversion rate of 60% to 70%, respectively.

3. The method according to claim 1, wherein the polymerization further comprises an aromatic vinyl monomer, a vinyl cyanide monomer, or a combination thereof.

4. The method according to claim 1, wherein a conjugated diene monomer, an emulsifier, an initiator, an electrolyte, a molecular weight regulator, and ion exchanged water are present in a composition that undergoes the polymerization and the polymerization is initiated at 65 to 70° C.

5. The method according to claim 4, wherein the initiator is one or more selected from the group consisting of potassium persulfate, sodium persulfate, ammonium persulfate, cumene hydroperoxide, diisopropylbenzene hydroperoxide, azobisisobutyronitrile, tertiary butyl hydroperoxide, paramethane hydroperoxide, and benzoyl peroxide.

6. The method according to claim 4, wherein the electrolyte is one or more selected from the group consisting of KCl, NaCl, KHCO$_3$, NaHCO$_3$, K$_2$CO$_3$, Na$_2$CO$_3$, KHSO$_3$, NaHSO$_3$, Na$_2$S$_2$O$_7$, K$_4$P$_2$O$_7$, K$_3$PO$_4$, Na$_3$PO$_4$, K$_2$HPO$_4$, and Na$_2$HPO$_4$.

7. The method according to claim 4, wherein the molecular weight regulator is one or more selected from the group consisting of n-decyl mercaptan, n-dodecyl mercaptan, t-dodecyl mercaptan, and n-octadecyl mercaptan.

8. The method according to claim 1, wherein, in Formula 1, R$^1$ is H or CH$_3$, R$^2$ is C$_2$H$_4$ or C$_3$H$_6$, R$^3$ is CH$_2$, R$^4$ is C$_2$H$_5$, l is an integer of 0 to 2, n is an integer of 4 to 10, m is an integer of 3 to 4, and the product of m and n is 12 to 30.

9. The method according to claim 1, wherein, in the polymerization, a portion of the conjugated diene monomer is added batchwise or continuously at a polymerization conversion rate of 30% to 40%.

10. The method according to claim 9, wherein the polymerization is performed at 72 to 75° C.

11. The method according to claim 1, wherein the molecular weight regulator is one or more selected from the group consisting of n-octyl mercaptan, sec-octyl mercaptan, n-nonyl mercaptan, n-decyl mercaptan, n-dodecyl mercaptan, t-dodecyl mercaptan, and n-octadecyl mercaptan.

12. The method according to claim 1, wherein the emulsifier having a CMC of 150 mg/L or less comprises an emulsifier having a CMC of 10 mg/L or less or an emulsifier having a CMC of greater than 10 mg/L and 150 mg/L or less.

13. The method according to claim 12, wherein the emulsifier having a CMC of 10 mg/L or less is added, at a polymerization conversion rate of 60% to 85%.

14. The method according to claim 12, wherein the emulsifier having a CMC of 10 mg/L or less is one or more selected from the group consisting of C$_{16}$ to C$_{18}$ alkenyl succinic acid di-potassium salt, polyoxyethylene alkyl phenyl ether, and polyoxyethylene alkylphenyl ether ammonium sulfate.

15. The method according to claim 12, wherein the emulsifier having a CMC of greater than 10 mg/L and 150 mg/L or less is added, at a polymerization conversion rate 50 to 85%.

16. The method according to claim 12, wherein the emulsifier having a CMC of greater than 10 mg/L and 150 mg/L or less is one or more selected from the group consisting of fatty acid soap, potassium oleate, and sodium oleate.

17. The method according to claim 1, wherein, in the polymerization, a portion of the conjugated diene monomer and the emulsifier are added batchwise or continuously at a polymerization conversion rate of 60% to 70%.

18. The method according to claim 17, wherein the polymerization is performed at 80 to 85° C.

* * * * *